United States Patent [19]

Harwood et al.

[11] 4,061,165

[45] Dec. 6, 1977

[54] PORTABLE TOOL

[75] Inventors: William James Harwood, Saginaw; Robert P. Snyder, Bay City, both of Mich.

[73] Assignee: William James Harwood, Saginaw, Mich.

[21] Appl. No.: 714,363

[22] Filed: Aug. 16, 1976

[51] Int. Cl.[2] .......................... B27C 9/00; B23D 67/00; B23B 3/28

[52] U.S. Cl. .......................... 144/1 R; 29/76 R; 142/1

[58] Field of Search .......................... 29/76, 27; 144/1 R, 144/1 G, 1 D, 1 E, 1 F; 142/1

[56] References Cited

U.S. PATENT DOCUMENTS

| | | | |
|---|---|---|---|
| 1,726,702 | 9/1929 | Heston | 142/1 |
| 1,982,254 | 11/1934 | Juengling | 144/1 G |
| 2,071,201 | 2/1937 | Frech | 144/1 R |
| 2,765,009 | 10/1956 | Doernor | 144/1 R |
| 2,768,663 | 10/1956 | Jones | 144/1 R |
| 2,888,965 | 6/1959 | Phillips | 144/1 R |
| 3,276,489 | 10/1966 | Little | 141/1 |
| 3,316,946 | 5/1967 | Ryan et al. | 144/1 R |

FOREIGN PATENT DOCUMENTS

| | | | |
|---|---|---|---|
| 611,948 | 11/1948 | United Kingdom | 144/1 R |

*Primary Examiner*—Harrison L. Hinson
*Attorney, Agent, or Firm*—J. M. Kuszaj; E. E. Schilling

[57] ABSTRACT

A portable apparatus for reducing the dimensions of a workpiece using rotatable work means. The apparatus comprises in combination: a portable electric drill motor having a shaft-receiving chuck; a work means rotatable about its longitudinal axis and supported by the chuck and a journalled support member; a guide member supporting the drill motor; a base member adapted to receive and support (1) the guide member adjacent one end, (2) the journalled support member adjacent the other end, and (3) a working element support between the guide member and the journalled support member; the base member having retentive parallel positioning rails extending longitudinally along each lateral edge of a face of the base member; the guide member being slidable longitudinally of the base member whereby the drill motor is adjustably positionabletoward the journalled support member to allow the working means to be rotatably supported.

9 Claims, 5 Drawing Figures

PORTABLE TOOL

BACKGROUND OF THE INVENTION

The present invention relates generally to a portable apparatus, and more in particular to a portable apparatus for reducing the dimensions of a workpiece using rotatable work means and having a portable electric drill motor as the drive means. Such drill motors include both battery-driven and line-driven motors.

Numerous motor-driven tools are found in the prior art which are capable of reducing the dimensions of a workpiece by using rotatable work means. These include lathes wherein the rotatable work means is a workstock shaped by a fixed, i.e., non-rotating, tool or a generally cylindrical or tapered file circular in section wherein the rotatable work means is an abrading tool which shapes the workstock. Generally, each of these prior art devices is either incorporated into a strongly built apparatus which is too heavy to be readily movable manually by one individual from place to place, or if truly portable, is not designed to be accurate, reliable, safe and durable. Furthermore, so far as is known, the rotatable work means of the various prior art devices are not capable of being interchangeably driven by a light, easily portable power source such as a portable electric drill motor. This often requires the craftsman to acquire separately powered devices for each lathing or filing operation, as well as for certain abrading operations such as grinding, honing or sanding.

It is, therefore, desirable to provide a single portable apparatus for reducing the dimensions of a workpiece which apparatus includes an electric drill motor, rotatable work means, a base member for adjustably positioning the electric drill motor, a journalled support member adapted to support the rotatable work means thereon in operative relationship, and a working element support member, the work means including, alternatively an abrading tool or a piece of workstock, the entire apparatus being not only portable but also accurate, reliable, safe the durable, while being relatively inexpensive to construct and maintain.

SUMMARY OF THE INVENTION

The apparatus of the present invention is a portable apparatus for reducing the dimensions of a workpiece using rotatable work means. The apparatus comprises in combination: a portable electric drill motor having a shaft-receiving chuck; a guide member having supported thereon said electric drill motor; a channelled base member having a first end and a second end and adapted to receive and adjustably support (1) adjacent the first end thereof said guide member, (2) adjacent the second end thereof a journalled support member, and (3) between said guide member and said journalled support member a working element support; and work means rotatable about its longitudinal axis and terminating at each of first and second ends in a portion extending in the axial direction and supported respectively by said chuck and by said journalled support member;

said base member having retentive substantially parallel positioning rails extending longitudinally along each lateral edge of a face of said base member; said guide member being slidable longitudinally of said base member whereby the drill motor mounted thereon is adjustably positionable with respect to the journalled support member; and said base member being substantially coextensive with the combination of said guide member and said journalled support member.

SUMMARY DESCRIPTION OF THE DRAWINGS

PARTICULARIZED DESCRIPTION OF THE INVENTION

Figure 1:
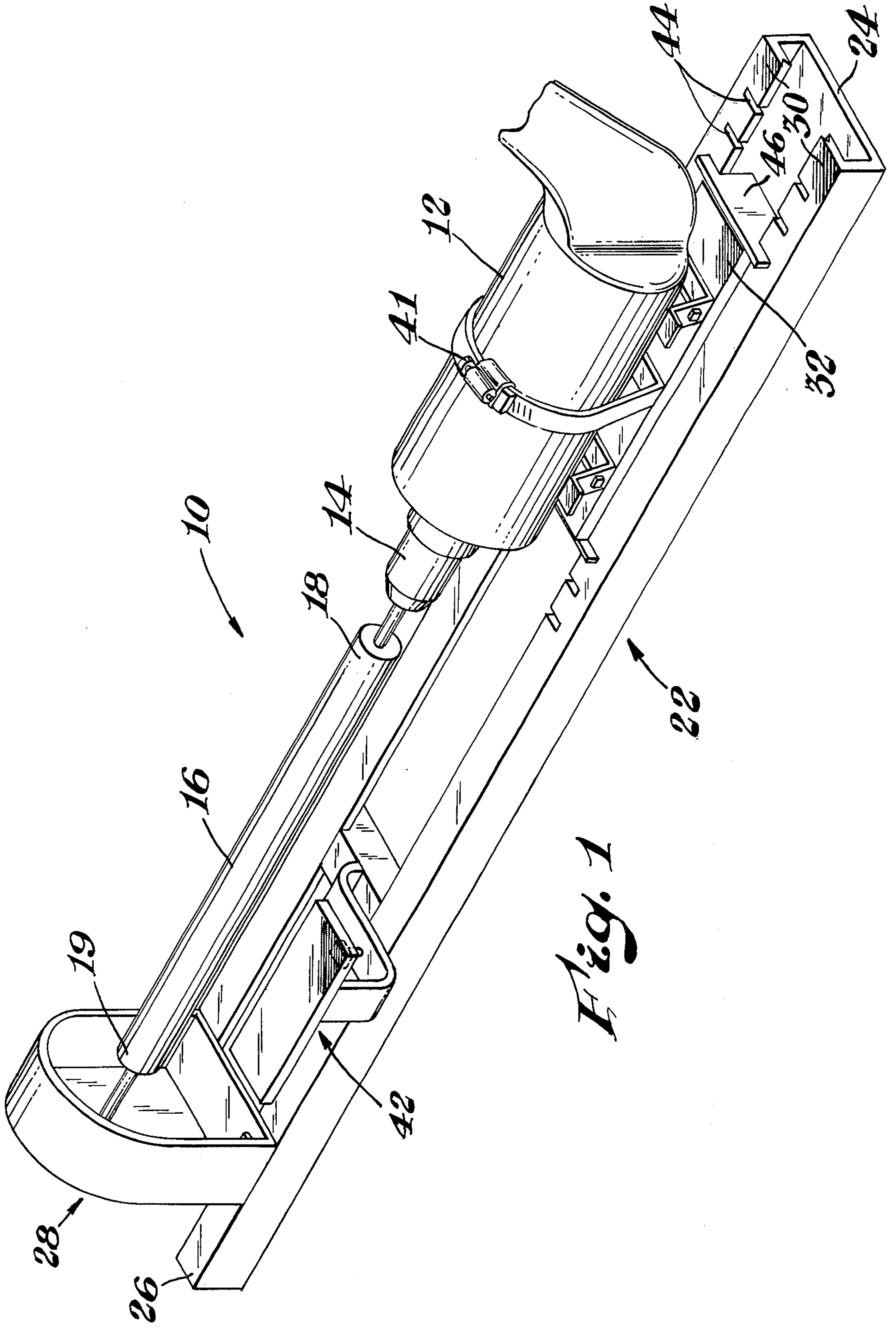
FIG. 1 is a view in isometric projection of an embodiment of the apparatus in accordance with the present invention.

Referring now to the embodiment illustrated in FIG. 1, there is depicted an apparatus in accordance with the present invention designated generally by the reference numeral 10. The apparatus 10 is seen to include a portable electric drill motor 12 having a shaft-receiving chuck 14; a rotatable work means 16, such as a workstock, terminating in a first end portion 18 and a second end portion 19, said first end portion being supported by the chuck 14 upon the end portion or shaft 18 engaged by the tool-receiving chuck 14, and the second end portion being supported by a journalled support member 28; a guide member indicated generally by the numeral 20 having supported thereon the portable electric drill motor 12; and an elongated rectangular channelled base member 22, having a first end 24 and a second end 26. The base member 22 supports the guide member 20 adjacent the first end 24 thereof and supports adjacent the second end 26 thereof the journalled support member 28 which is adapted to receive in the bearing thereof the second end portion 19 of work means 16. Between the guide member 20 and the journalled support member 28, the base member 22 supports a working element support 42. The base member 22 has retentive parallel opposed positioning rails or flanges 30 extending longitudinally along each lateral edge of a face of the base member 22 and having a V-shaped groove therein although other retaining means may be used, if desired, for the guide member. The guide member 20 when released is slidable longitudinally of the base member 22, the flanges of the guide member bridging and slidably engaging said V-shaped grooves, and the portable electric drill motor 12 as supported in the guide member 20 is adjustably advanceable upon moving the guide member 20 toward the journalled support member 28. To give proper support to the apparatus, the base member 22 should be at least substantially coextensive with the combination of the guide member 20 and the journalled support member 28 when suitably spaced to receive rotatable work means 16.

Figure 5:
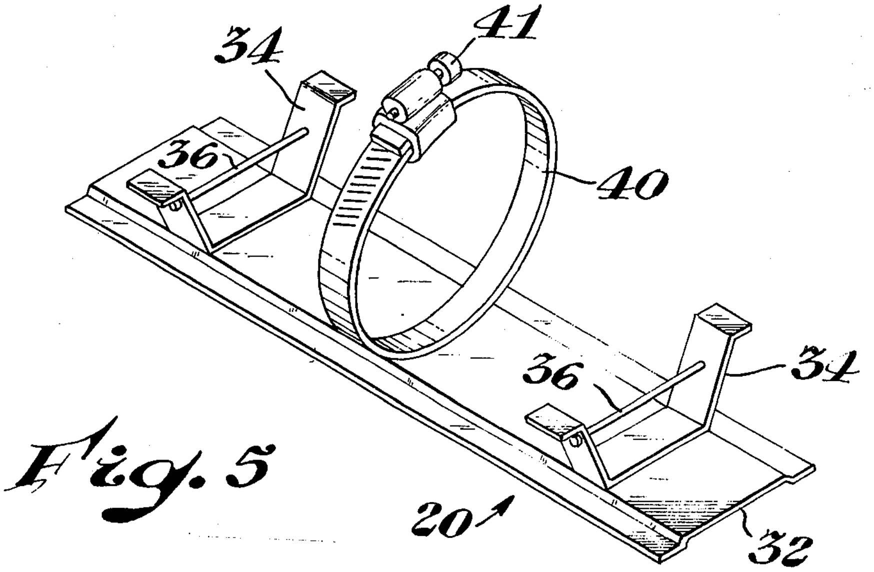
FIG. 5 is a view in isometric projection of the guide member for the drill motor shown in FIG. 1.

Referring now particularly to FIG. 5, the guide member 20 is seen to include an elongated support member 32 having generally an inverted "U" shape in section with the longitudinal edges terminating in outwardly extending flanges, the outwardly extending flanges being adapted to slide in the grooves of rails or flanges 30 and to be retained by the flanges defining such grooves which form a part of the base member 22, as shown in FIG. 1. If desired, the grooves could be formed in the flanges of the guide member 20 and the flanges of the base member 22 could be formed to be slidable therein. Two spaced-apart U-shaped support brackets 34 are attached with the closed sides back-to-back to the support member 32 adjacent each end of the support member 32. The support brackets 34 are adapted to cradle and support the portable electric drill motor 12. Compression means extend through each of the U-shaped support brackets 34 for selectively adjusting the spatial separation between upstanding arms of the U-shaped support brackets 34. Suitable compression means includes a threaded fastening element such as a bolt 36 extending through the face of each U-shaped support bracket 34 and secured by an element such as a nut 38 threaded thereon. Any suitable compression and fastening means can be used in place of the bolt 36 and nut 38 provided that the compression produced thereby against the lateral faces of support brackets 34 will cause the spatial separation of the upstanding arms of the U-shaped support brackets 34 to be reduced or, if loosened, to expand to adapt to the curvature and dimensions of a wide variety of commercially available portable electric drill motors 12. The selective adjustability of the respective U-shaped brackets 34 of guide member 20 also affords and permits a leveling of the portable electric drill motor 12 so that the axis of the drill motor extends along a line substantially parallel to the plane of the guide member 20 and consequently also base member 22.

The guide member assembly 20 also includes fastening means attached to the support member 32 as by tack welding or riveting for firmly securing the portable electric drill motor 12 to the guide member 20 so that the drill does not move normal to its axis when it is in operation. The electric drill motor 12 may be fastened to the guide member 20 in most any way that holds the drill firmly so that it does not oscillate. However, the fastening means is conveniently and preferably a hose clamp 40, located at about mid-length of the guide member 20. Preferably, the hose clamp 40 is provided with an adjustable, threadable closure means 41 adaptable to receive various sizes and shapes of electric drill motors.

As is evident from FIG. 1, the guide member 20 is considerably shorter than the base member 22 so that a certain amount of adjustable longitudinal movement is afforded the guide member 20 when it is slidably engaged in the base member 22. In nearly all applications it is desirable to have the guide member 20 remain at a predetermined position along the base member 22 during use. While the slidable engagement may provide sufficient stability during use in some cases, it is preferred to assuredly fix the positions of the guide member 20. Accordingly, in one embodiment, the retentive parallel positioning rails 30 are provided with a plurality of indexing apertures 44 spaced the length of the guide member 20. The indexing apertures each preferably extend through the inwardly extending flange portion of the positioning rails 30, and are spaced along the parallel positioning rails 30 at positions corresponding to predetermined spacing needs between the guide member 20 and the journalled support member 28, which spacing can vary depending upon the longitudinal dimensions of the working means employed. A movable stopping means, such as a key 46 drops into and is slidably held in one pair of the indexing apertures 44 at each end of the guide member 20. Each key is of sufficient dimensions to block the guide member 20 and to prevent movement of the guide member 20 along the base member 22 in the direction of the key 46.

In the embodiment shown in FIG. 1, the channelled base member 22 is generally rectangular in shape. The retentive longitudinal parallel positioning rails 30 upstanding from and substantially coextensive with the base member 22 have mutually opposed inwardly extending flanges each with a longitudinal groove formed therein. Preferably, the base member 22 can have apertures (not shown) therein for affixing the base to a supportive surface such as a horizontal surface such as a work bench by suitable fastening means such as a bolt. Advantageously, other fastening means such as at least one "C" clamp or a vise can be employed for securing the base member 22.

Figure 3:
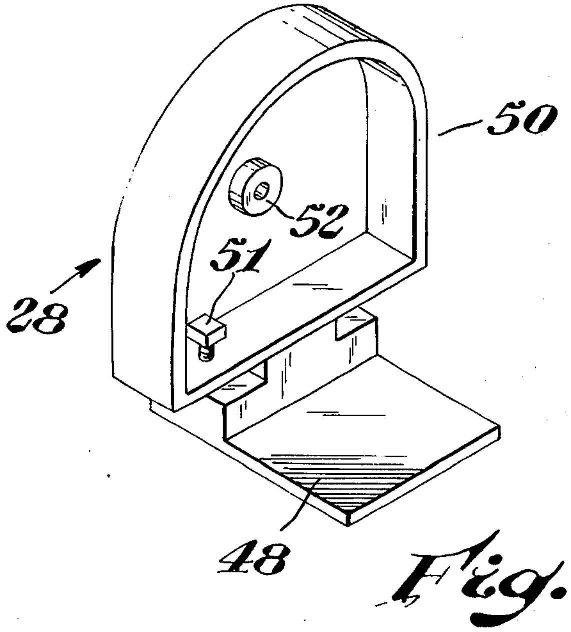
FIG. 3 is a view in isometric projection of the journalled support member shown in FIG. 1.

Referring now to FIG. 3, there is illustrated an embodiment of the journalled support member 28 of the present invention in which the journalled support member 28 includes a base portion 48 adapted to slidably nest in or engage the channel of the base member 22 with the upstanding portion extending between the positioning rails 30 adjacent the second end 26 of the base member 22. If desired, the journalled support member 28 may be otherwise slidably or fixedly attached to the base member 22. Preferably, the journalled support member 28 is fixed in a given position relative to the rest of the apparatus as by bolting to the base member 22 or is compressed or biased against the face of base member 22 with a set screw 51 extending through a portion thereof adjacent one of the positioning rails 30.

A frame portion 50 extends generally upward from the base portion 48 and is journalled to receive in the bearing 52 thereof the second end portion 19 extending in the axial direction from the work means 16. The frame portion 50 can be a substantially enclosed body shell or merely a sturdy skeletal structure depending on the magnitude and nature of the rotatable work means 16, and the desires and needs of the user.

Figure 4:
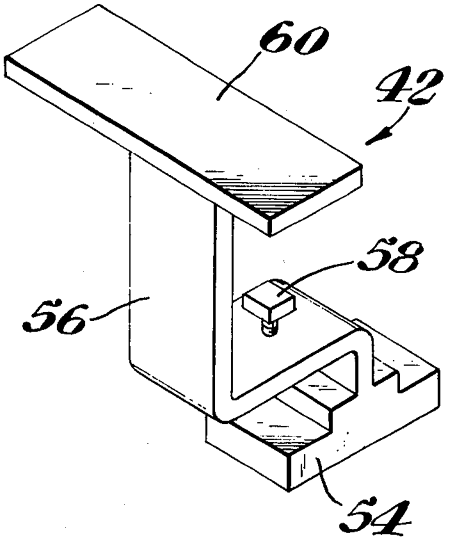
FIG. 4 is a view in isometric projection of the work element support shown in FIG. 1.

Referring now to FIG. 4, there is illustrated an embodiment of the work element support 42 in which the support 42 includes a base portion 54 adapted to allow the work element support 42 to slidably nest in or engage the channel of the base member 22 with an upstanding shank portion 56 extending outwardly from the channel between the longitudinal positioning rails 30 of base member 22. The shank portion 56 extends generally upward from the base portion 54 and to the lateral side of the work means 16. Preferably, a biasing set screw 58 or other suitable locking means, extends through a portion of the shank 56 as shown and is adapted to compress or bias the base portion 54 against a side or face of the base member 22, thus fixing the working element support 42 at a predetermined position along the base member 22. A table portion 60 is supported on the distal end of shank 56 and is adapted to manually rest a working element (not shown) thereon. Depending upon the work means, the working element will be an abrading or cutting tool, e.g., where the rotatable work means is workstock, or workstock, e.g., where the rotatable work means is a tool such as a cylindrical or tapered file.

Figure 2:
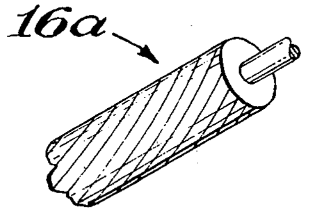
FIG. 2 is a somewhat enlarged fragmentary view of a portion of one end of the work means in an alternate embodiment of the apparatus of FIG. 1 in which the work means is a tool, viz., a file.

A variety of rotatable work means 16 can be used in the present apparatus. FIG. 1 illustrates a preferred embodiment wherein the work means is a workstock such as wood, machinable plastic, or a machinable metal such as aluminum or magnesium or suitable alloy of either. FIG. 2 illustrates a fragmentary view of an end of another embodiment wherein the work means is an abrading tool such as a file having a circular cross-section. In either embodiment the work means is freely rotatable about its longitudinal axis and terminates at each of its first and second ends in portions 18, 19 extending in the axial direction.

In using the apparatus of the present invention, in the embodiment shown in FIG. 1, a portable electric drill motor 12, conveniently a battery-operated drill motor, is mounted, secured, and leveled on the guide member 20 with the handle grip up so that the shaft-receiving chuck 14 extends along a line substantially parallel to the plane of the guide member 20 and consequently also base member 22. The guide member 20 is engaged in the base member 22 by sliding the outwardly extending flanges of support member 32 between the retentive parallel positioning rails 30 adjacent the first end 24 of the base member 22. The working element support 42 is engaged in base member 22 by slidably nesting the base portion 54 in the channel and between the positioning rails 30, adjacent the second end 26 of the base member 22. The journalled support member 28, is engaged in the base member 22 by sliding the base portion 48 into the channel and between the retentive parallel positioning rails 30 adjacent the second end 26 of the base member 22. The second end portion 19 of the work means 16 is supported in the bearing of the journalled support member 28. The guide member 20 is advanced toward the journalled support member 28 until the shaft-receiving chuck 14 of the portable electric drill motor 12 engages the first end portion 18 of the work means 16. The shaft-receiving chuck 14 is then locked to securely hold the first end portion 18 of work means 16. Key 46 is then fixed in indexing apparatus 44 and prevents the guide member 20 from advancing along the base member 22. The portable electric drill motor 12 is turned on and the work means 16 is caused to rotate at a predetermined speed. A working tool is held on the working element support and manual pressure urges the tool into the surface of the work means 16, until the dimensions of the workpiece have been reduced to a desired extent.

Each of the components of the present apparatus, apart from the drill motor and the hose clamp may be formed of a suitable metal of construction such as ferrous metal, aluminum or magnesium of an appropriate gauge.

If desired, and oftentimes with great advantage, other attachments to, changes, modifications or inclusions in embodiments of the present invention can be provided and utilized without departing substantially from its apparent and intended spirit and scope. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A portable apparatus for reducing the dimensions of a workpiece using rotatable work means comprising in combination:

a. a portable electric drill motor having a shaft-receiving chuck;

b. a journalled support member;

c. a working element support;

d. work means rotatable about its longitudinal axis and terminating at each of first and second ends in a portion extending in the axial direction and supported respectively by said chuck and by a journalled support member;

e. a guide member having supported thereon said electric drill motor;

f. a channelled base member having a first end and a second end and adapted to receive and adjustably support (1) adjacent the first end thereof said guide member, (2) adjacent the second end thereof said journalled support member, and (3) between said guide member and said journalled support member said working element support;

g. means for assuredly fixing each of said guide member, journalled support member, and working element support a predetermined distance along said base member;

said base member having mutually opposed inwardly extending flanges extending longitudinally along each lateral edge of a face of said base member;

said guide member being slidable longitudinally of said base member whereby the drill motor supported thereon is adjustably positionable with respect to the journalled support member;

said guide member having a support member having generally an inverted "U" shape in section with longitudinal edges terminating in outwardly extending flanges adapted to cooperatively engage the inwardly extending flanges of said base member; two spaced-apart U-shaped support brackets attached to said support member adjacent each end thereof, for holding in a cradle-like arrangement said drill motor; compression means extending through each of said support brackets for selectively adjusting the spatial separation between upstanding arms of said support brackets to adapt to the curvature and dimensions of a variety of portable electric drill motors and to permit the leveling of said portable electric drill motor so that the axis of said motor extends along a line substantially parallel to the plane of said base member; fastening means attached to said support member for securing said drill motor to said guide member; and said base member being substantially coextensive with the combination of the guide member and said journalled support member.

2. The apparatus of claim 1 wherein the mutually opposed inwardly extending flanges of the base member each having a longitudinal groove formed therein.

3. The apparatus of claim 1 wherein the rotatable work means is an abrading tool.

4. The apparatus of claim 3 wherein the abrading tool is a file that is circular in cross-section.

5. The apparatus of claim 1 wherein the rotatable work means is a workstock.

6. The apparatus of claim 5 wherein the workstock is selected from the group consisting of wood, machinable plastic, and machinable metal.

7. The apparatus of claim 1 wherein the base member is in the form of a channel and the working element support comprises a base portion adapted to slidably nest in the channel of said base member between said slidable guide member retaining means, a shank portion extending generally upward from between said guide member retaining means and a table portion supported on said shank portion for resting the working element thereon.

8. The apparatus of claim 1 wherein the means for assuredly fixing said guide member includes stopping means adapted to engage indexing means on said base member for fixing said guide member a predetermined distance along said base member for the journalled support member.

9. The apparatus of claim 1 wherein the base member is in the form of a channel wherein the journalled support member comprises a base portion adapted to slidably nest in the channel of said base member between said slidable guide member retaining means and a frame portion extending between said retaining means, said frame portion being journalled to receive an end of said work means.

* * * * *